United States Patent
Watanabe et al.

(10) Patent No.: US 8,687,316 B2
(45) Date of Patent: Apr. 1, 2014

(54) SPINDLE MOTOR AND DISK DRIVE APPARATUS

(71) Applicant: Nidec Corporation, Kyoto (JP)

(72) Inventors: Tsuchitsugu Watanabe, Kyoto (JP);
Tomohiro Yokosawa, Kyoto (JP);
Hirofumi Takayama, Kyoto (JP);
Takashi Shimizu, Kyoto (JP); Sho Fukuhara, Kyoto (JP)

(73) Assignee: Nidec Corporation, Kyoto (JP)

(*) Notice: Subject to any disclaimer, the term of this patent is extended or adjusted under 35 U.S.C. 154(b) by 0 days.

(21) Appl. No.: 13/775,480

(22) Filed: Feb. 25, 2013

(65) Prior Publication Data

US 2013/0271870 A1    Oct. 17, 2013

Related U.S. Application Data

(60) Provisional application No. 61/625,128, filed on Apr. 17, 2012.

(30) Foreign Application Priority Data

Apr. 13, 2012 (JP) .................................. 2012-092296

(51) Int. Cl.
G11B 19/20    (2006.01)
(52) U.S. Cl.
USPC ..................................................... 360/99.08
(58) Field of Classification Search
USPC ..................................................... 360/99.08
See application file for complete search history.

(56) References Cited

U.S. PATENT DOCUMENTS

| 5,572,381 A | 11/1996 | Stewart |
| 6,118,198 A | 9/2000 | Hollenbeck et al. |
| 6,652,324 B2 | 11/2003 | Maiers et al. |

(Continued)

FOREIGN PATENT DOCUMENTS

| JP | 07-075275 A | 3/1995 |
| JP | 07-107693 A | 4/1995 |

(Continued)

OTHER PUBLICATIONS

Saichi et al., "Spindle Motor Having Connecting Mechanism Connecting Lead Wire and Circuit Board, and Storage Disk Drive Having the Same", U.S. Appl. No. 13/029,143, filed Feb. 17, 2011.

(Continued)

*Primary Examiner* — Mark Blouin
(74) *Attorney, Agent, or Firm* — Keating & Bennett, LLP

(57) ABSTRACT

In a spindle motor, a cup portion of a base member includes a cylindrical portion and a bottom plate portion. The cylindrical portion is concentric or substantially concentric with a central axis extending in a vertical direction. The bottom plate portion closes a bottom portion of the cylindrical portion. The bearing mechanism is accommodated in the cup portion. An adhesive is arranged between an outer circumferential surface of the bearing mechanism and an inner circumferential surface of the cylindrical portion. At least one of the outer circumferential surface of the bearing mechanism and the inner circumferential surface of the cylindrical portion includes an axially extending vertical groove. A communicating hole which is not filled with the adhesive is arranged in at least a portion of an inside of the vertical groove. The communicating hole extends continuously from an upper to a lower end portion of the vertical groove.

17 Claims, 11 Drawing Sheets

(56) References Cited

U.S. PATENT DOCUMENTS

| | | | |
|---|---|---|---|
| 6,771,460 B2 | 8/2004 | Nii et al. | |
| 7,012,191 B1 | 3/2006 | Watanabe et al. | |
| 7,105,963 B2 | 9/2006 | Ito et al. | |
| 7,144,275 B2 | 12/2006 | Iida | |
| 7,254,882 B2 | 8/2007 | Ito et al. | |
| 7,684,146 B1 | 3/2010 | Andrikowich et al. | |
| 7,757,378 B1 | 7/2010 | Mann et al. | |
| 8,120,217 B2 | 2/2012 | Yawata et al. | |
| 8,120,872 B2 | 2/2012 | Sekii et al. | |
| 8,164,851 B2 | 4/2012 | Yoneda et al. | |
| 8,189,290 B2 * | 5/2012 | Sakata et al. | 360/99.08 |
| 8,299,668 B2 | 10/2012 | Yawata et al. | |
| 8,304,945 B2 | 11/2012 | Yawata et al. | |
| 8,324,771 B2 | 12/2012 | Yawata et al. | |
| 8,324,776 B2 * | 12/2012 | Tamaoka et al. | 310/90 |
| 8,395,861 B2 * | 3/2013 | Tashiro | 360/99.08 |
| 8,451,558 B2 * | 5/2013 | Watanabe et al. | 360/99.08 |
| 2005/0206255 A1 | 9/2005 | Yoshino et al. | |
| 2006/0023339 A1 | 2/2006 | Fukuyama et al. | |
| 2006/0281229 A1 | 12/2006 | Koh et al. | |
| 2009/0316299 A1 | 12/2009 | Tashiro et al. | |

FOREIGN PATENT DOCUMENTS

| | | |
|---|---|---|
| JP | 07-222386 A | 8/1995 |
| JP | 07-334967 A | 12/1995 |
| JP | 11-218128 A | 8/1999 |
| JP | 2000-209804 A | 7/2000 |
| JP | 2001-067775 A | 3/2001 |
| JP | 2005-057892 A | 3/2005 |
| JP | 2006-040423 A | 2/2006 |
| JP | 2009-110611 A | 5/2009 |

OTHER PUBLICATIONS

Sugi et al., "Motor Unit and Disk Drive Apparatus", U.S. Appl. No. 13/290,209, filed Nov. 7, 2011.

Sugi et al., "Spindle Motor, and Disk Drive Apparatus Including the Spindle Motor", U.S. Appl. No. 13/334,620, filed Dec. 22, 2011.

Matsuyama et al., "Spindle Motor, Disk Drive Apparatus, and Method of Manufacturing Spindle Motor", U.S. Appl. No. 13/424,632, filed Mar. 20, 2012.

Watanabe, "Method of Manufacturing Motor, Motor, and Disk Drive Apparatus", U.S. Appl. No. 13/437,103, filed Apr. 2, 2012.

Sugi et al., "Spindle Motor, Disk Drive Apparatus, and Method of Manufacturing Spindle Motor", U.S. Appl. No. 13/241,773, filed Sep. 23, 2011.

Watanabe et al., "Base Unit, Spindle Motor, and Disk Drive Apparatus", U.S. Appl. No. 61/625,132, filed Apr. 17, 2012.

Yawata, "Spindle Motor, Disk Drive Apparatus, and Method of Manufacturing Spindle Motor", U.S. Appl. No. 13/365,286, filed Feb. 3, 2012.

Yawata et al., "Spindle Motor and Storage Disk Drive Apparatus", U.S. Appl. No. 13/662,615, filed Oct. 29, 2012.

Watanabe et al., "Base Unit, Spindle Motor, and Disk Drive Apparatus", U.S. Appl. No. 13/775,493, filed Feb. 25, 2013.

* cited by examiner

SPINDLE MOTOR AND DISK DRIVE APPARATUS

BACKGROUND OF THE INVENTION

1. Field of the Invention

The present invention relates to a spindle motor and a disk drive apparatus.

2. Description of the Related Art

Spindle motors arranged to rotate disks are installed in hard disk drives. A conventional hard disk drive and a conventional spindle motor are described, for example, in JP-A 2006-040423. Paragraph [0032] of JP-A 2006-040423 states that the spindle motor (SPM) is fixed to a base of a hard disk drive (HDD). In addition, paragraph [0065] of JP-A 2006-040423 states that a low-density gas having a lower density than that of an air, such as He, is used as an atmosphere inside a hard disk assembly (HDA).

A case of the hard disk drive is arranged to be substantially airtight in order to keep an interior space thereof clean. In particular, the low-density gas, such as He, tends to easily pass through even a minute gap. Therefore, in the case where an interior of the case is to be filled with the low-density gas, as in JP-A 2006-040423, extreme airtightness is required. In order to improve the airtightness of the case, it is desirable that the number of through holes defined in a base thereof should be decreased.

Meanwhile, a bearing mechanism arranged to support a rotating portion of the spindle motor is fixed to the base of the hard disk drive. In order to fix the bearing mechanism without providing a through hole in the base, it is conceivable, for example, to provide a cup portion having a bottom and being cylindrical in the base, and insert the bearing mechanism in the cup portion. However, when the bearing mechanism is inserted into the cup portion having the bottom and being cylindrical, resistance against insertion of the bearing mechanism into the cup portion may be increased because a gas cannot travel downward out of the cup portion. This will decrease efficiency in an assembling operation and make it difficult to accurately position the bearing mechanism with respect to a base member.

SUMMARY OF THE INVENTION

A spindle motor according to a preferred embodiment of the present invention includes a base member, a bearing mechanism fixed to the base member, and a rotating portion rotatably supported by the bearing mechanism. The base member includes a cup portion including a cylindrical portion and a bottom plate portion. The cylindrical portion is arranged to be concentric or substantially concentric with a central axis extending in a vertical direction. The bottom plate portion is defined integrally with the cylindrical portion as a single monolithic member, and is arranged to close a bottom portion of the cylindrical portion. The bearing mechanism is accommodated in the cup portion. An adhesive is arranged between an outer circumferential surface of the bearing mechanism and an inner circumferential surface of the cylindrical portion. At least one of the outer circumferential surface of the bearing mechanism and the inner circumferential surface of the cylindrical portion includes an axially extending vertical groove. A communicating hole which is not filled with the adhesive is provided in at least a portion of an inside of the vertical groove. The communicating hole is arranged to extend continuously from an upper end portion to a lower end portion of the vertical groove.

In the spindle motor according to the above preferred embodiment of the present invention, a gas which is present between the bearing mechanism and the bottom plate portion is allowed to pass through the communicating hole inside the vertical groove to be discharged out of the cup portion, when the bearing mechanism is inserted into the cup portion. Resistance against insertion of the bearing mechanism into the cup portion is thus significantly reduced.

The above and other elements, features, steps, characteristics and advantages of the present invention description of the preferred embodiments with reference to the attached drawings.

DETAILED DESCRIPTION OF THE PREFERRED EMBODIMENTS

Hereinafter, exemplary preferred embodiments of the present invention will be described with reference to the accompanying drawings. It is assumed herein that a direction parallel to a central axis of a spindle motor is referred to as an "axial direction", that directions perpendicular to the central axis of the spindle motor are each referred to as a "radial direction", and that a direction along a circular arc centered on the central axis of the spindle motor is referred to as a "circumferential direction". It is also assumed herein that the axial direction is a vertical direction, and that a side on which a bearing mechanism is arranged with respect to a bottom plate portion of a cup portion is an upper side, and the shape of each member or portion and relative positions of different members or portions will be described on the above assumptions. Note, however, that the above definitions of the vertical direction and the upper and lower sides are simply made for the sake of convenience in description, and should not be construed to restrict the orientation of a spindle motor or a disk drive apparatus according to any preferred embodiment of the present invention when in use.

Also note that the wording "parallel direction" as used herein includes substantially parallel directions. Also note that the wording "perpendicular direction" as used herein includes substantially perpendicular directions.

Figure 1:
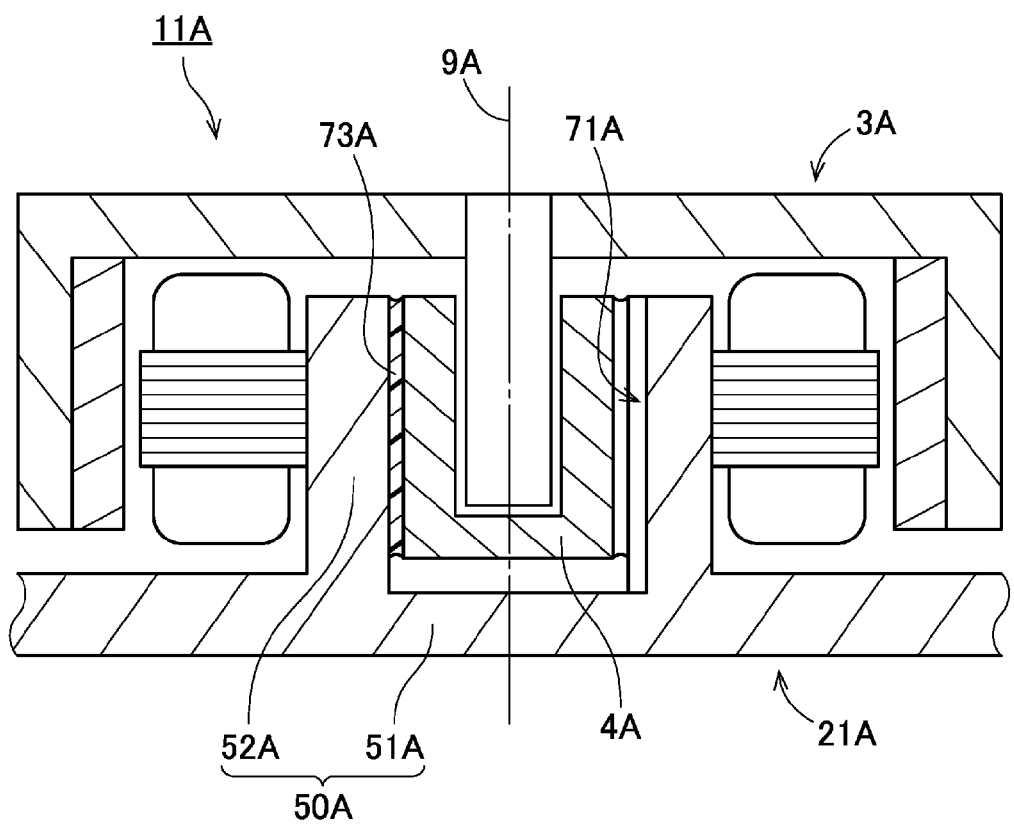
FIG. 1 is a vertical cross-sectional view of a spindle motor according to a preferred embodiment of the present invention.

FIG. 1 is a vertical cross-sectional view of a spindle motor 11A according to a preferred embodiment of the present invention. As illustrated in FIG. 1, the spindle motor 11A preferably includes a base member 21A, a bearing mechanism 4A, and a rotating portion 3A. The bearing mechanism 4A is fixed to the base member 21A. The rotating portion 3A is rotatably supported by the bearing mechanism 4A.

The base member 21A preferably includes a bottom plate portion 51A and a cylindrical portion 52A. The cylindrical portion 52A is arranged to be concentric or substantially concentric with a central axis 9A. The bottom plate portion 51A is arranged to close a bottom portion of the cylindrical portion 52A. The bottom plate portion 51A and the cylindrical portion 52A are arranged to together define a single monolithic and continuous cup portion 50A.

Figure 2:
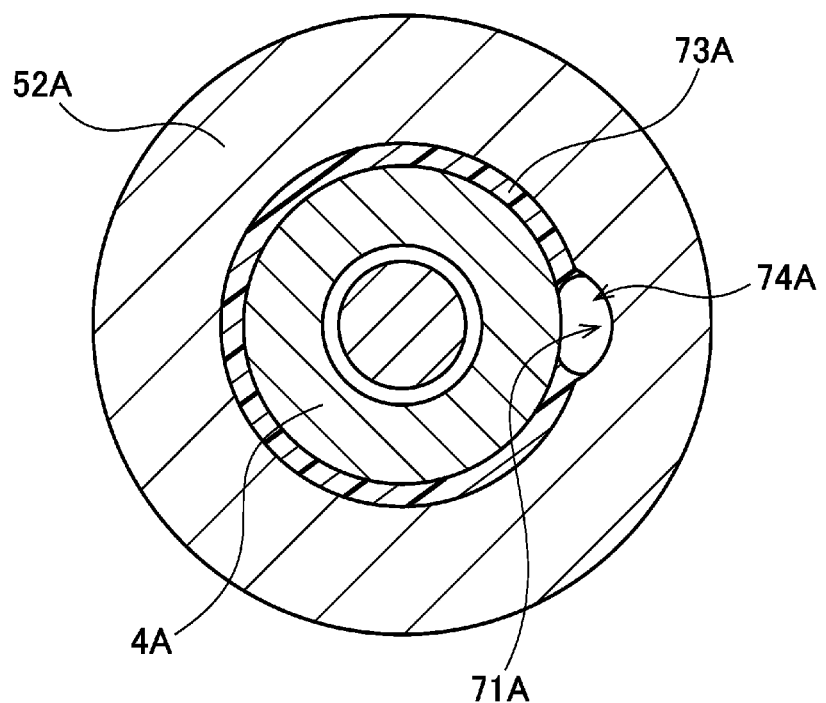
FIG. 2 is a horizontal cross-sectional view of a cylindrical portion and a bearing mechanism according to a preferred embodiment of the present invention.

FIG. 2 is a horizontal cross-sectional view of the cylindrical portion 52A and the bearing mechanism 4A. As illustrated in FIGS. 1 and 2, the bearing mechanism 4A is accommodated in the cup portion 50A. In addition, an adhesive 73A is preferably arranged between an outer circumferential surface of the bearing mechanism 4A and an inner circumferential surface of the cylindrical portion 52A. Thus, the bearing mechanism 4A is fixed to the cylindrical portion 52A.

Moreover, the inner circumferential surface of the cylindrical portion 52A preferably includes an axially extending vertical groove 71A. Then, as illustrated in FIG. 2, a communicating hole 74A, which is preferably not filled with the adhesive 73A, is provided in at least a portion of an inside of the vertical groove 71A. The communicating hole 74A is preferably arranged to extend continuously from an upper end portion to a lower end portion of the vertical groove 71A.

When the spindle motor 11A is manufactured, the bearing mechanism 4A is inserted inside the cylindrical portion 52A of the cup portion 50A. At this time, a gas which is present between the bearing mechanism 4A and the bottom plate portion 51A travels through the communicating hole 74A inside the vertical groove 71A to be discharged out of the cup portion 50A. Thus, resistance against insertion of the bearing mechanism 4A into the cup portion 50A is reduced.

Figure 3:
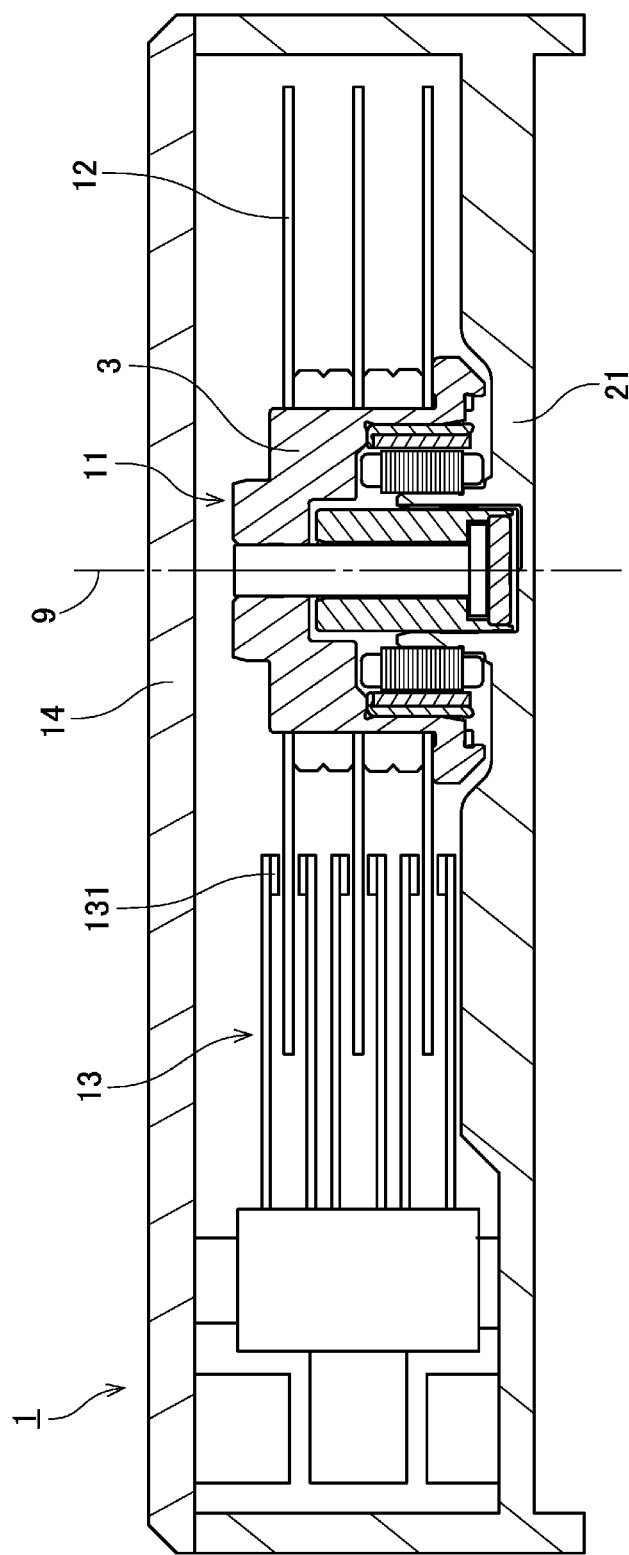
FIG. 3 is a vertical cross-sectional view of a disk drive apparatus according to a preferred embodiment of the present invention.

FIG. 3 is a vertical cross-sectional view of a disk drive apparatus 1 according to a more specific preferred embodiment of the present invention. The disk drive apparatus 1 is arranged to read and write information from or to magnetic disks 12 while rotating the magnetic disks 12. As illustrated in FIG. 3, the disk drive apparatus 1 preferably includes a spindle motor 11, three magnetic disks 12, an access portion 13, and a cover 14.

The spindle motor 11 is arranged to support the three magnetic disks 12, and to rotate these magnetic disks 12 about a central axis 9. The spindle motor 11 includes a base member 21 arranged to extend radially on a lower side of the magnetic disks 12. A rotating portion 3 of the spindle motor 11, the three magnetic disks 12, and the access portion 13 are preferably accommodated in a case defined by the base member 21 and the cover 14. The access portion 13 includes heads 131. The access portion 13 is arranged to move the heads 131 along recording surfaces of the magnetic disks 12 to read and write information from or to the magnetic disks 12.

A junction between the base member 21 and the cover 14 is preferably sealed with a sealant, such as, for example, an elastomer. Thus, an interior space of the case is preferably kept airtight. The interior of the case is filled with a clean air containing few particles. Note that the interior of the case may alternatively be filled with any of helium, hydrogen, a gas mixture of helium and hydrogen, or a gas mixture of any one of the above and an air, instead of the air, for example. Resistance of the gas against the magnetic disks 12 can thereby be reduced.

Note that the number of magnetic disks 12 included in the disk drive apparatus 1 may alternatively be one, two, or more than three, for example. Also note that the access portion 13 may be arranged to perform only one of reading and writing of information from or to the magnetic disks 12.

Figure 4:
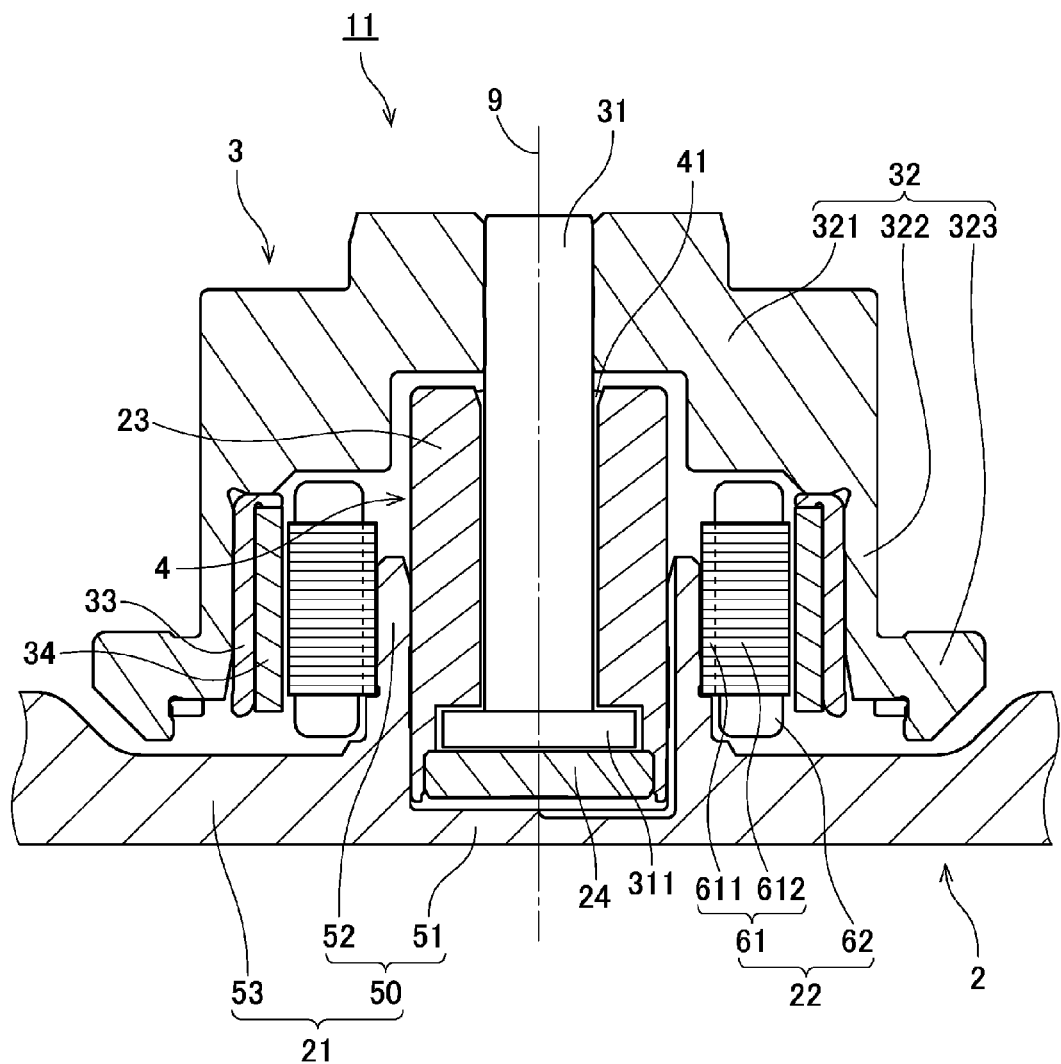
FIG. 4 is a vertical cross-sectional view of a spindle motor according to a preferred embodiment of the present invention.

Next, the structure of the above-described spindle motor 11 will now be described below. FIG. 4 is a vertical cross-sectional view of the spindle motor 11. As illustrated in FIG. 4, the spindle motor 11 includes a stationary portion 2 and the rotating portion 3. The rotating portion 3 is supported to be rotatable with respect to the stationary portion 2.

The stationary portion 2 according to the present preferred embodiment preferably includes the base member 21, an armature 22, a sleeve 23, and a cap 24.

The base member 21 is arranged to support the armature 22 and the sleeve 23. The base member 21 is preferably a metallic member, and is obtained, for example, by casting. The base member 21 is, for example, made of a material such as an aluminum alloy. As illustrated in FIG. 4, the base member 21 preferably includes an inner bottom plate portion 51, a cylindrical portion 52, and an outer bottom plate portion 53. The inner bottom plate portion 51, the cylindrical portion 52, and the outer bottom plate portion 53 are preferably defined by a single monolithic and continuous member.

The inner bottom plate portion 51 is arranged to extend in directions perpendicular or substantially perpendicular to the central axis 9 on a lower side of the sleeve 23 and the cap 24 to substantially assume the shape of a disk. The cylindrical portion 52 is arranged to extend upward from a radially outer edge portion of the inner bottom plate portion 51 to substantially assume the shape of a cylinder. In addition, the cylindrical portion 52 is arranged to be concentric or substantially concentric with the central axis 9. The inner bottom plate portion 51 is preferably arranged to close a bottom portion of the cylindrical portion 52. That is, the inner bottom plate portion 51 and the cylindrical portion 52 are arranged to together define a cup portion 50 including a bottom and being substantially cylindrical. The outer bottom plate portion 53 is arranged to extend further radially outward from the radially outer edge portion of the inner bottom plate portion 51.

The armature 22 preferably includes a stator core 61 and a plurality of coils 62. The stator core 61 is defined, for example, by laminated steel sheets. The laminated steel sheets are preferably a collection of electromagnetic steel sheets placed one upon another in the axial direction. A silicon steel sheet or the like, for example, is used as each of the electromagnetic steel sheets. The stator core 61 preferably includes an annular core back 611 and a plurality of teeth 612 arranged to project radially outward from the core back 611. The core back 611 is fixed to an outer circumferential surface of the cylindrical portion 52. The teeth 612 are preferably arranged at regular or substantially regular intervals in a circumferential direction. Each of the coils 62 is defined by a conducting wire wound around a separate one of the teeth 612.

The sleeve 23 is arranged to extend in the axial direction around a shaft 31 described below to substantially assume the shape of a cylinder. A lower portion of the sleeve 23 is accommodated in the cup portion 50. That is, the sleeve 23 is arranged radially inward of the cylindrical portion 52 and above the inner bottom plate portion 51. An outer circumferential surface of the sleeve 23 is preferably fixed to an inner circumferential surface of the cylindrical portion 52 through an adhesive. An inner circumferential surface of the sleeve 23 is preferably arranged radially opposite an outer circumferential surface of the shaft 31. In addition, a lower opening of the sleeve 23 is closed by the cap 24.

The rotating portion 3 according to the present preferred embodiment preferably includes the shaft 31, a hub 32, a back yoke 33, and a magnet 34.

The shaft 31 is arranged to extend in the axial direction on a radially inner side of the sleeve 23. A metal such as stainless steel, for example, is preferably used as a material of the shaft 31. An upper end portion of the shaft 31 is arranged to project upward from an upper surface of the sleeve 23. In addition, the shaft 31 preferably includes a plate portion 311 arranged to extend radially outward from a lower axial end portion thereof. An upper surface of the plate portion 311 is arranged axially opposite the sleeve 23. Accordingly, removal of the shaft 31 from the spindle motor 11 is prevented.

A lubricating fluid 41 is preferably arranged between the shaft 31 and a combination of the sleeve 23 and the cap 24. A surface of the lubricating fluid 41 is defined between the inner circumferential surface of the sleeve 23 and the outer circumferential surface of the shaft 31. The shaft 31 is supported through the lubricating fluid 41 to be rotatable with respect to the sleeve 23 and the cap 24. That is, in the present preferred embodiment, the sleeve 23 and the cap 24, which are members of the stationary portion 2, the shaft 31, which is a member of the rotating portion 3, and the lubricating fluid 41, which is arranged between the stationary portion 2 and the rotating portion 3, are preferably arranged to together define a bearing mechanism 4. The rotating portion 3 is rotatably supported by the bearing mechanism 4. A polyester oil or a diester oil, for example, is preferably used as the lubricating fluid 41.

The hub 32 preferably includes a top plate portion 321, an annular wall portion 322, and a flange portion 323. The top plate portion 321 is arranged to cover an upper side of the armature 22 and the sleeve 23. An inner circumferential surface of the top plate portion 321 is fixed to the upper end portion of the shaft 31. The annular wall portion 322 is arranged to extend downward from a radially outer edge portion of the top plate portion 321 to substantially assume the shape of a cylinder. The flange portion 323 is preferably arranged to project radially outward from a lower end portion of the annular wall portion 322.

The hub 32 is arranged to support the three magnetic disks 12. At least a portion of an inner circumferential portion of each magnetic disk 12 is arranged to be in contact with an outer circumferential surface of the annular wall portion 322. Each magnetic disk 12 is thus positioned radially. At least a portion of a lower surface of a lowermost one of the magnetic disks 12 is arranged to be in contact with an upper surface of the flange portion 323. The lowermost magnetic disk 12 is thus positioned in the axial direction.

The back yoke 33 is an annular member defined by a magnetic body. The back yoke 33 is preferably fixed to each of a lower surface of the top plate portion 321 and an inner circumferential surface of the annular wall portion 322 through, for example, an adhesive. In addition, the magnet 34, which is annular in shape, is preferably fixed to an inner circumferential surface of the back yoke 33 through, for example, the adhesive. An inner circumferential surface of the magnet 34 is arranged radially opposite radially outer end surfaces of the teeth 612. In addition, north and south poles are arranged alternately in the circumferential direction on the inner circumferential surface of the magnet 34.

Note that a plurality of magnets may alternatively be used in place of the annular magnet 34 if so desired. In the case where the plurality of magnets are used, the magnets are preferably arranged in the circumferential direction such that north and south poles alternate with each other.

In the spindle motor 11, once drive currents are supplied to the coils 62, radial magnetic flux is generated around each of the teeth 612 of the stator core 61. Then, interaction between the magnetic flux of the teeth 612 and the magnetic flux of the magnet 34 produces a circumferential torque, so that the rotating portion 3 is caused to rotate about the central axis 9 with respect to the stationary portion 2. The magnetic disks 12 supported by the hub 32 are caused to rotate about the central axis 9 together with the rotating portion 3.

Figure 5:
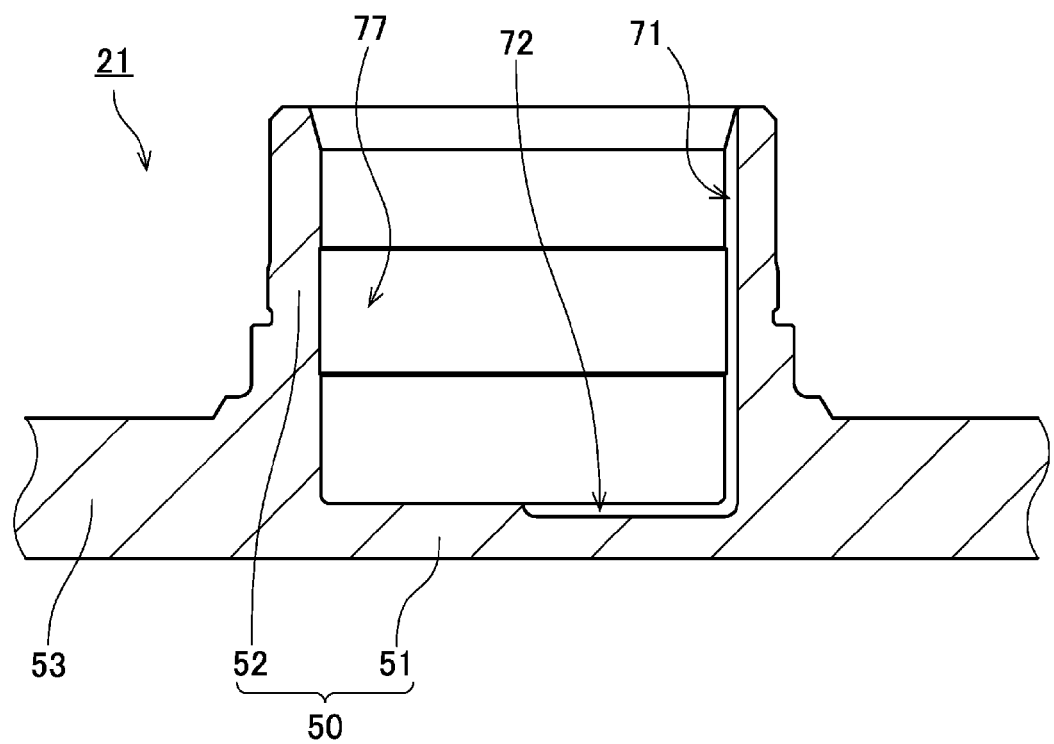
FIG. 5 is a partial vertical cross-sectional view of a base member according to a preferred embodiment of the present invention.
Figure 6:
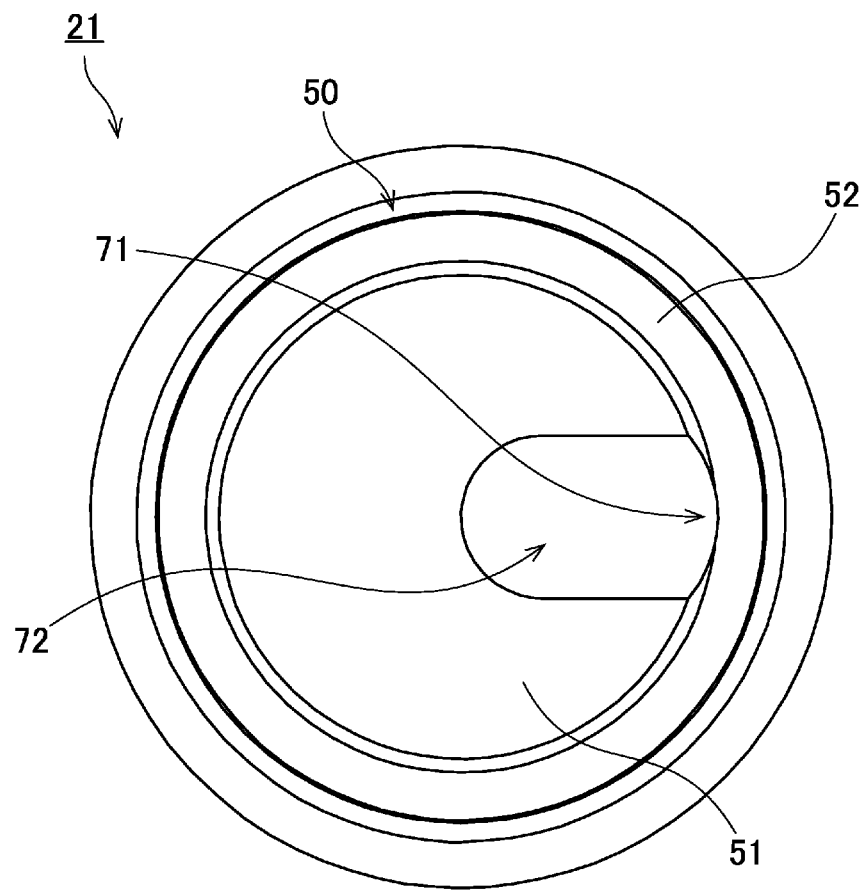
FIG. 6 is a partial top view of the base member according to a preferred embodiment of the present invention.

Next, a structure by which the base member 21 and the bearing mechanism 4 are fixed to each other will now be further described below. FIG. 5 is a partial vertical cross-sectional view of the base member 21. FIG. 6 is a partial top view of the base member 21. As described above, the base member 21 includes the cup portion 50 including the bottom and being cylindrical or substantially cylindrical and which is defined by the inner bottom plate portion 51 and the cylindrical portion 52.

As illustrated in FIGS. 5 and 6, the inner circumferential surface of the cylindrical portion 52 preferably includes a vertical groove 71. The vertical groove 71 is recessed radially outward in the inner circumferential surface of the cylindrical portion 52. In addition, the vertical groove 71 is arranged to extend in the axial direction from an upper end portion to a lower end portion of the cylindrical portion 52. Moreover, an upper surface of the inner bottom plate portion 51 preferably includes a horizontal groove 72. The horizontal groove 72 is recessed downward in the upper surface of the inner bottom plate portion 51. In addition, the horizontal groove 72 is arranged to extend in a radial direction from a lower end portion of the vertical groove 71 to a center of the inner bottom plate portion 51. That is, the vertical groove 71 is continuous with the horizontal groove 72.

Figure 7:
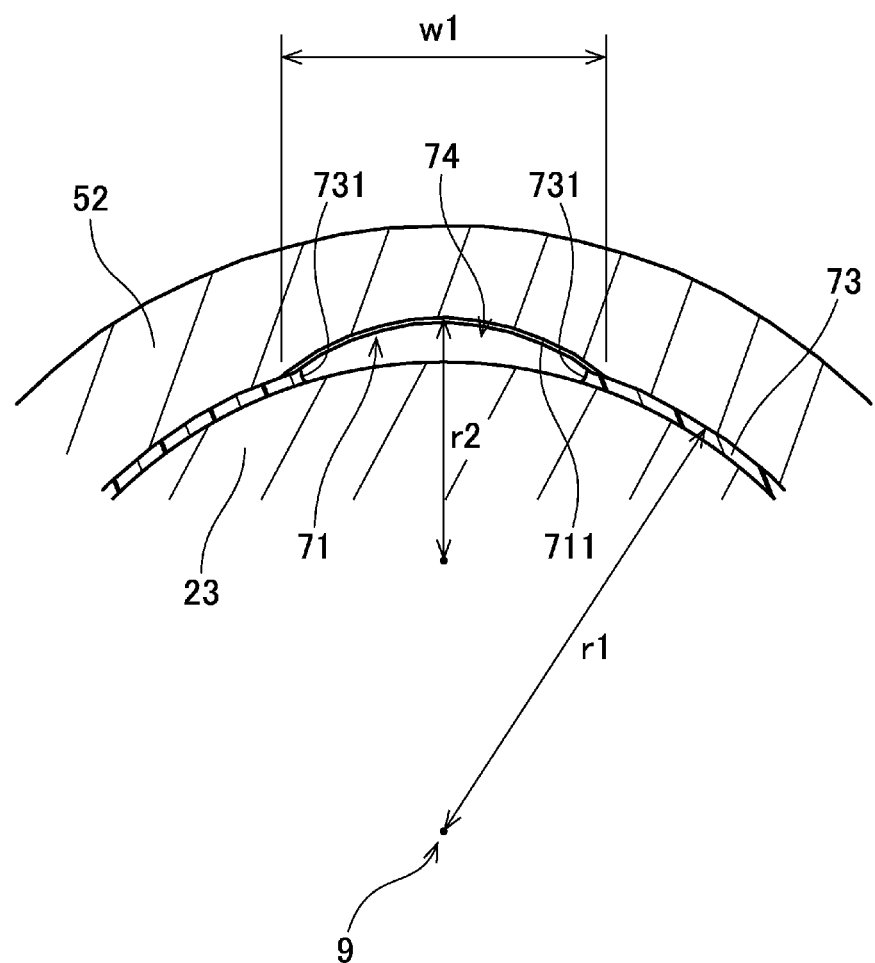
FIG. 7 is a partial horizontal cross-sectional view of the base member and a sleeve according to a preferred embodiment of the present invention.
Figure 8:
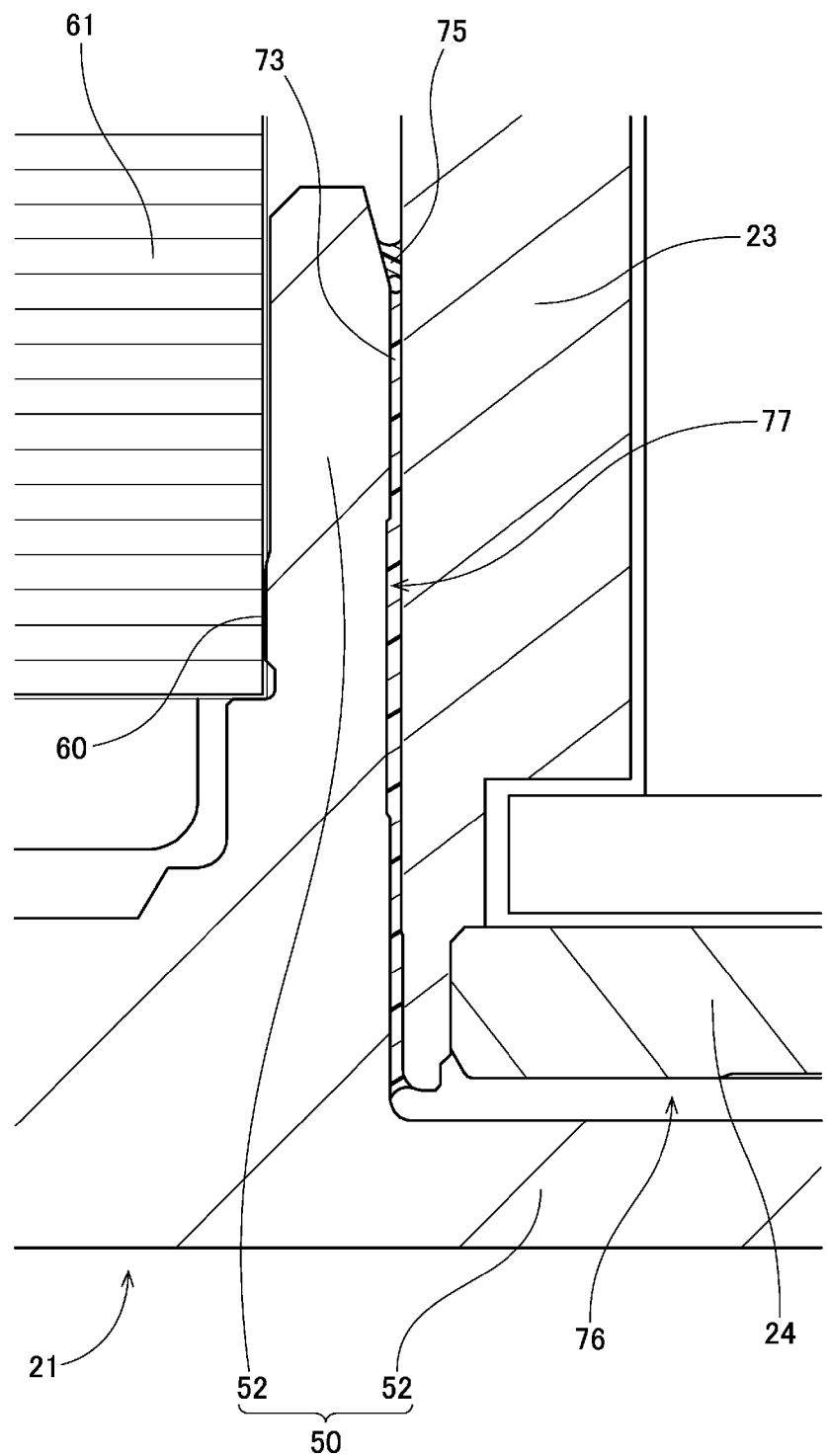
FIG. 8 is a partial vertical cross-sectional view of the spindle motor according to a preferred embodiment of the present invention.

FIG. 7 is a partial horizontal cross-sectional view of the cylindrical portion 52 and the sleeve 23. FIG. 8 is a partial vertical cross-sectional view of the spindle motor 11. As illustrated in FIGS. 7 and 8, an adhesive 73 is arranged between the outer circumferential surface of the sleeve 23 and the inner circumferential surface of the cylindrical portion 52. The cylindrical portion 52 and the sleeve 23 are fixed by this arrangement. An epoxy resin adhesive, for example, is preferably used as the adhesive 73.

As illustrated in FIG. 7, the adhesive 73 according to the present preferred embodiment is not arranged to extend continuously in an annular shape around the sleeve 23, but is instead arranged to extend in the shape of a circular arc in the circumferential direction. A communicating hole 74, which preferably is not filled with the adhesive 73, is arranged inside the vertical groove 71. The communicating hole 74 refers to a portion of a space inside the vertical groove 71 which is not reached by the adhesive 73 and accordingly defines a gap. The communicating hole 74 is preferably arranged to extend continuously from an upper end portion to a lower end portion of the vertical groove 71. Therefore, the gas is allowed to flow through the communicating hole 74 between the upper end portion and the lower end portion of the vertical groove 71.

Moreover, as illustrated in FIG. 8, an electrically conductive adhesive 75, which is preferably different in type from the adhesive 73, is arranged between the outer circumferential surface of the sleeve 23 and an inner circumferential surface of a portion of the cylindrical portion 52 which is in the vicinity of the upper end portion of the cylindrical portion 52. Any electric charge generated in the rotating portion 3 preferably flows to the base member 21 through the lubricating fluid 41, the sleeve 23, and the electrically conductive adhesive 75. The rotating portion 3 is thus effectively prevented from being electrified. Note that the electrically conductive adhesive 75 may be arranged between the outer circumferential surface of the sleeve 23 and an inner circumferential surface of a portion of the cylindrical portion 52 which is in the vicinity of the lower end portion of the cylindrical portion 52.

Furthermore, as illustrated in FIG. 8, each of a lower end portion of the sleeve 23 and a lower surface of the cap 24 is preferably arranged axially opposite the upper surface of the inner bottom plate portion 51 with a gap 76 intervening therebetween. That is, a lower end portion of the bearing mechanism 4 is arranged axially opposite the upper surface of the inner bottom plate portion 51 with the gap 76 intervening therebetween. When the spindle motor 11 is manufactured, the axial position of each of the sleeve 23 and the cap 24 is determined without being regulated by the inner bottom plate portion 51. Each of the sleeve 23 and the cap 24 is thus positioned accurately in the axial direction.

Figure 9:
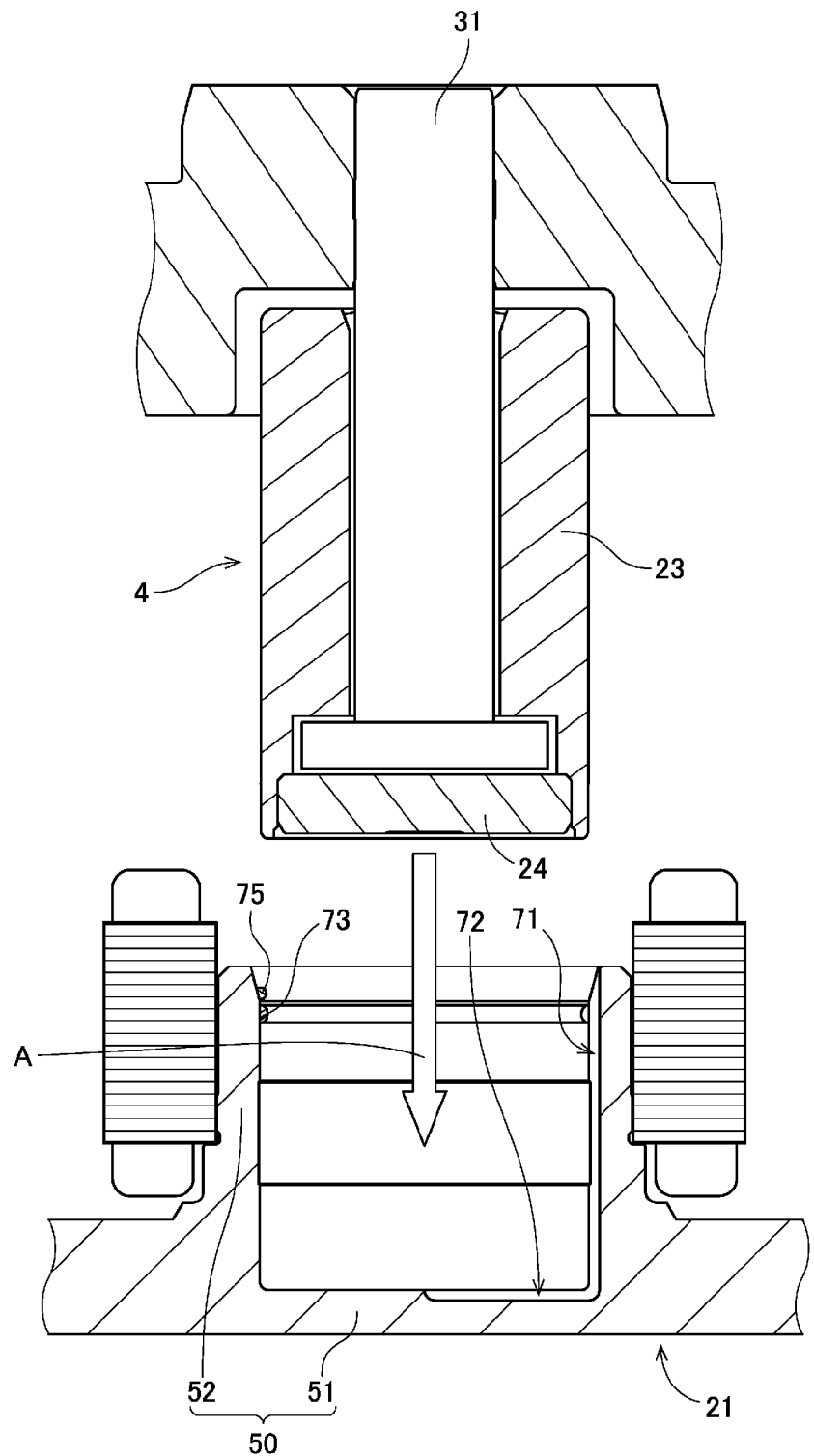
FIG. 9 is a diagram illustrating how a spindle motor according to a preferred embodiment of the present invention is manufactured.

FIG. 9 is a vertical cross-sectional view illustrating a manner in which the bearing mechanism 4 is fitted to the cup portion 50 of the base member 21. In an example of FIG. 9, the adhesive 73 and the electrically conductive adhesive 75 are preferably first applied to the inner circumferential surface of the cylindrical portion 52. The electrically conductive adhesive 75 is preferably applied to the inner circumferential surface of the portion of the cylindrical portion 52 which is in the vicinity of the upper end portion of the cylindrical portion 52. The adhesive 73 is preferably applied to a position below the electrically conductive adhesive 75 such that the adhesive 73 is arranged to extend in the shape of a circular arc in the circumferential direction. Thereafter, the bearing mechanism 4 is preferably inserted into the cup portion 50 from above the cup portion 50 as indicated by an arrow outline A with a blank inside in FIG. 9. As a result, each of the adhesive 73 and the electrically conductive adhesive 75 is arranged between the inner circumferential surface of the cylindrical portion 52 and the outer circumferential surface of the sleeve 23. In addition, insertion of the bearing mechanism 4 causes the adhesive 73 to spread downward.

When the bearing mechanism 4 is inserted into the cup portion 50, a gas which is present between a lower end portion of the bearing mechanism 4 and the upper surface of the inner bottom plate portion 51 is preferably discharged upward out of the vertical groove 71 through the communicating hole 74 inside the vertical groove 71. Thus, a rise in atmospheric pressure in a space between the lower end portion of the bearing mechanism 4 and the upper surface of the inner bottom plate portion 51 is effectively prevented. Resistance against the insertion of the bearing mechanism 4 into the cup portion 50 is accordingly reduced.

In particular, in the present preferred embodiment, a space inside the vertical groove 71 and a space inside the horizontal groove 72 are continuous with each other. This contributes to more securely discharging the gas which is present between the lower end portion of the bearing mechanism 4 and the upper surface of the inner bottom plate portion 51 out of the cup portion 50 through the horizontal groove 72 and the communicating hole 74 inside the vertical groove 71. Moreover, a space in the vicinity of the lower end portion of the vertical groove 71 is expanded by the horizontal groove 72. Therefore, even if the adhesive 73 is spread up to the vicinity of the lower end portion of the cylindrical portion 52 at the time of the insertion of the bearing mechanism 4, it is unlikely that the vicinity of the lower end portion of the vertical groove 71 will be completely sealed with the adhesive 73. Therefore, the gas which is present between the bearing mechanism 4 and the inner bottom plate portion 51 can be discharged more securely.

Moreover, even after the spindle motor 11 is manufactured, the gap 76 between the bearing mechanism 4 and the inner bottom plate portion 51 is in communication with an outside of the cup portion 50 through the communicating hole 74 inside the vertical groove 71. Therefore, a change in ambient temperature would preferably not easily cause a difference in pressure between the gap 76 and the outside of the cup portion 50. Therefore, neither the sleeve 23 nor the cap 24 tends to easily get distorted due to a pressure.

Furthermore, as illustrated in FIG. 9, the electrically conductive adhesive 75 is preferably applied to a position, on the inner circumferential surface of the cylindrical portion 52, which does not overlap with the vertical groove 71. The electrically conductive adhesive 75 is thus arranged at the position which does not overlap with the vertical groove 71 between the bearing mechanism 4 and the cup portion 50. This arrangement makes it unlikely for the electrically conductive adhesive 75 to enter into the vertical groove 71. In particular, in the present preferred embodiment, the electrically conductive adhesive 75 is preferably arranged at a circumferential position opposite to that of the vertical groove 71 in a plan view. This arrangement further reduces the likelihood that the electrically conductive adhesive 75 will enter into the vertical groove 71.

Returning to FIG. 7, the adhesive 73, which is present in the vicinity of the vertical groove 71, will now be further described below. In the present preferred embodiment, the adhesive 73 preferably includes a pair of surfaces 731 facing in the circumferential direction. Both the pair of surfaces 731 are arranged closer to a circumferential center of the vertical groove 71 than are circumferential end portions of the vertical groove 71. Note, however, that the adhesive 73, before being cured, stays in the vicinity of each of the circumferential end portions of the vertical groove 71 through surface tension. That is, a pressure acting in a direction away from the circumferential center of the vertical groove 71 acts on the adhesive 73 in the vicinity of each of the pair of surfaces 731. This pressure makes it easier for the communicating hole 74 to be defined.

In particular, in the present preferred embodiment, a surface of the cylindrical portion 52 which defines the vertical groove 71 is preferably arranged in the shape of a circular or substantially circular arc in a plan view. In addition, as illustrated in FIG. 7, the curved surface which defines the vertical groove 71 is arranged to have a radius of curvature r2 smaller than a radius of curvature r1 of the inner circumferential surface of the cylindrical portion 52. Because of this arrangement, at each of the circumferential end portions of the vertical groove 71, the radial distance between the outer circumferential surface of the sleeve 23 and the curved surface which defines the vertical groove 71 gradually increases with decreasing distance from the circumferential center of the vertical groove 71. This makes it easier for the adhesive 73, before being cured, to stay in the vicinity of each of the circumferential end portions of the vertical groove 71 through surface tension. This in turn enables the communicating hole 74 to be defined at and near the circumferential center of the vertical groove 71.

In order to ensure that the communicating hole 74 is not filled with the adhesive 73, it is desirable that the circumferential width w1 of the vertical groove 71 should be large. For example, the circumferential width w1 of the vertical groove 71 is preferably arranged to be greater than about one third of the inside diameter (r1×2) of the cylindrical portion 52.

In addition, as illustrated in FIG. 7, in the present preferred embodiment, a surface of the vertical groove 71 is preferably covered with an electrodeposition coating layer 711. Meanwhile, a metal surface of the, for example, aluminum alloy is exposed throughout the inner circumferential surface of the cylindrical portion 52 except the surface of the vertical groove 71. To this metal surface, the adhesive 73 is adhered more easily than to a surface of the electrodeposition coating layer 711. This enables the adhesive 73 to be easily held between the inner circumferential surface of the cylindrical portion 52 and the outer circumferential surface of the sleeve 23. This contributes to more secure adhesion between the cylindrical portion 52 and the sleeve 23.

Note that it is preferable that, when the base member 21 is manufactured, electrodeposition coating is first be applied to an entire surface of the base member 21, for example, and thereafter the inner circumferential surface of the cylindrical portion 52 is subjected to a cutting process. This method allows the metal surface to be exposed throughout the inner circumferential surface of the cylindrical portion 52 except the vertical groove 71 while leaving the electrodeposition coating layer 711 on the surface of the vertical groove 71.

Furthermore, as illustrated in FIG. 8, according to the present preferred embodiment, the inner circumferential surface of the cylindrical portion 52 preferably includes an inner circumferential groove 77 arranged to extend in the circumferential direction. The radial distance between the outer circumferential surface of the sleeve 23 and a curved surface which defines the inner circumferential groove 77 is preferably greater than the radial distance between the outer circumferential surface of the sleeve 23 and a remaining portion of the inner circumferential surface of the cylindrical portion 52, excluding the inner circumferential groove 77. In addition, the inner circumferential groove 77 and an area 60 of contact between the cylindrical portion 52 and the stator core 61 are arranged to overlap with each other in the radial direction. That is, the inner circumferential groove 77 and the stator core 61, which is fixed to the outer circumferential surface of the cylindrical portion 52, are arranged to overlap with each other in the radial direction. This makes it more unlikely for a radially inward stress which the cylindrical portion 52 receives through the contact area 60 to be transmitted to the sleeve 23. This reduces the likelihood of distortion of the sleeve 23.

While exemplary preferred embodiments of the present invention have been described above, the present invention is not limited to the above-described preferred embodiments.

Figure 10:
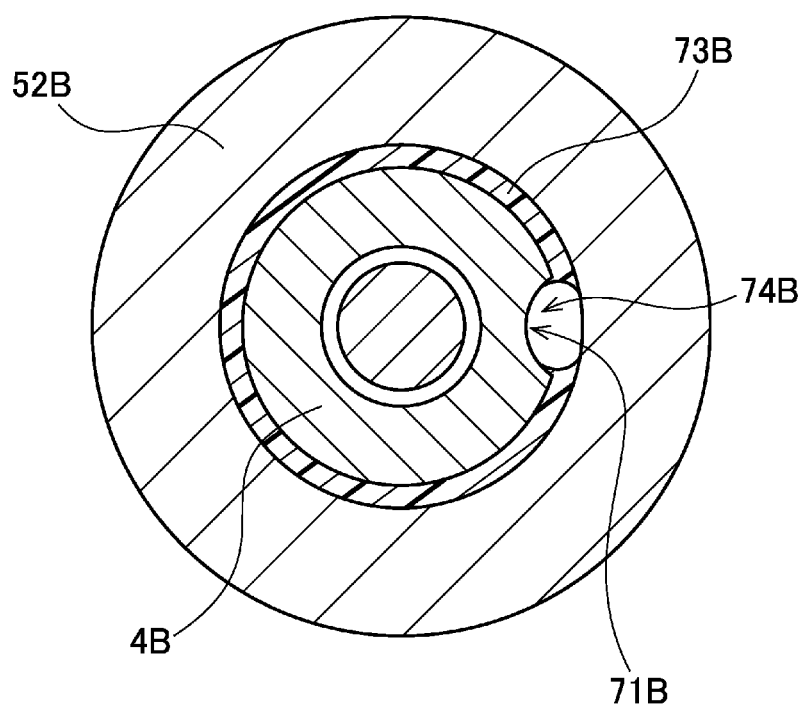
FIG. 10 is a horizontal cross-sectional view of a cylindrical portion and a bearing mechanism according to an example modification of a preferred embodiment of the present invention.

FIG. 10 is a horizontal cross-sectional view of a cylindrical portion 52B and a bearing mechanism 4B according to an example modification of a preferred embodiment of the present invention. In the example of FIG. 10, an axially extending vertical groove 71B is defined in an outer circumferential surface of the bearing mechanism 4B. Then, a communicating hole 74B, which preferably is not filled with an adhesive 73B, is provided inside the vertical groove 71B. This arrangement also allows a gas to flow through the communicating hole 74B between an upper end portion and a lower end portion of the vertical groove 71B. That is, it is enough that the vertical groove is defined in at least one of the inner circumferential surface of the cylindrical portion and the outer circumferential surface of the bearing mechanism.

Note, however, that it is preferable that the vertical groove be defined in the inner circumferential surface of the cylindrical portion as in each of the above-described preferred embodiments, because of a lower probability of a reduced rigidity of the bearing mechanism.

Figure 11:
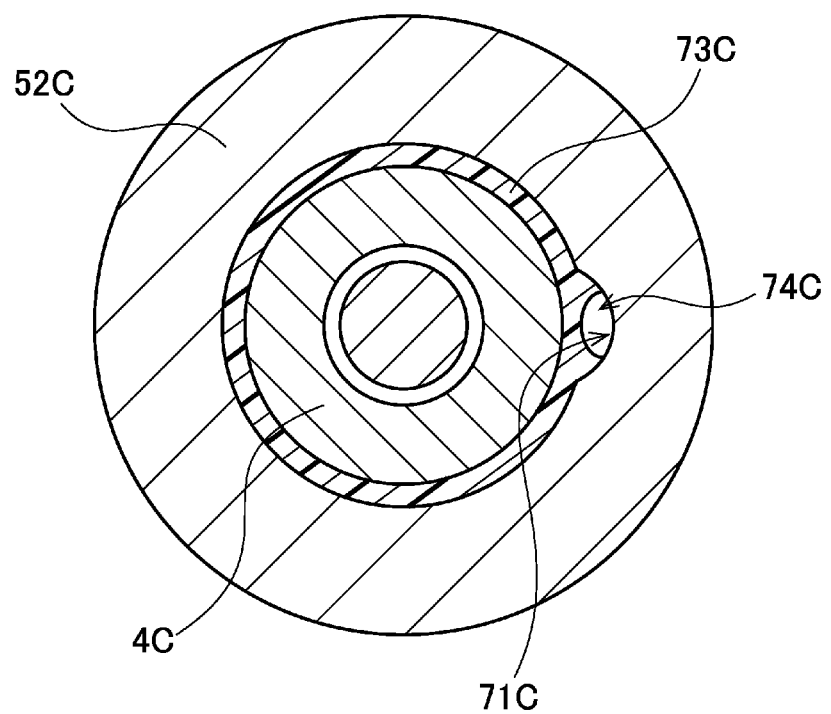
FIG. 11 is a horizontal cross-sectional view of a cylindrical portion and a bearing mechanism according to an example modification of a preferred embodiment of the present invention.

FIG. 11 is a horizontal cross-sectional view of a cylindrical portion 52C and a bearing mechanism 4C according to another example modification of a preferred embodiment of the present invention. In the example of FIG. 11, an adhesive 73C is preferably arranged to extend continuously in an annular shape in the circumferential direction. This arrangement also allows a gas to flow through a communicating hole 74C, if the communicating hole 74C is provided in at least a portion of an inside of a vertical groove 71C.

Also note that the vertical groove may be arranged to extend in an upward/downward direction obliquely with respect to the central axis, or may be arranged to extend spirally in the upward/downward direction. That is, with respect to the vertical groove, it is enough that a direction in which the vertical groove extends has an axial component. Also note that the horizontal groove may be a groove which extends in a direction other than the radial direction in the upper surface of the bottom plate portion, or may be a groove which extends in a curve in the upper surface of the bottom plate portion.

Also note that the adhesive is not limited to the epoxy resin adhesive, but an acrylic resin adhesive or the like, for example, may be used alternatively. Also note that the adhesive is preferably an adhesive which has at least one property among a thermosetting property, an anaerobic setting property, and a UV-curing property.

Also note that the sleeve may be defined by a plurality of members as opposed to being defined by a single member. For example, the sleeve may be defined by two members: a sleeve housing and a sleeve body arranged inside the sleeve housing. In this case, the outer circumferential surface of the bearing mechanism refers to an outer circumferential surface of the sleeve housing. Furthermore, the sleeve may also be defined by three members if so desired.

Note that the detailed shape of any member may be different from the shape thereof as illustrated in the accompanying drawings of the present application. Also note that features of the above-described preferred embodiments and the modifications thereof may be combined appropriately as long as no conflict arises.

The preferred embodiments of the present invention are applicable to a spindle motor and a disk drive apparatus.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A spindle motor comprising:
    a base member;
    a bearing mechanism fixed to the base member; and
    a rotating portion rotatably supported by the bearing mechanism; wherein
    the base member includes a cup portion including:
        a cylindrical portion arranged to be concentric or substantially concentric with a central axis extending in a vertical direction; and a bottom plate portion defined integrally with the cylindrical portion, and arranged to close a bottom portion of the cylindrical portion;

the bearing mechanism is accommodated in the cup portion;

an adhesive is arranged between an outer circumferential surface of the bearing mechanism and an inner circumferential surface of the cylindrical portion;

at least one of the outer circumferential surface of the bearing mechanism and the inner circumferential surface of the cylindrical portion includes an axially extending vertical groove; and a communicating hole which is not filled with the adhesive is arranged in at least a portion of an inside of the vertical groove, the communicating hole extending continuously from an upper end portion to a lower end portion of the vertical groove.

2. The spindle motor according to claim 1, wherein a lower end portion of the bearing mechanism and an upper surface of the bottom plate portion are arranged axially opposite each other with a gap intervening therebetween.

3. The spindle motor according to claim 2, wherein the inner circumferential surface of the cylindrical portion includes the vertical groove.

4. The spindle motor according to claim 3, wherein
the vertical groove has a circular or substantially circular arc shape in a plan view; and
a radius of curvature of a curved surface which defines the vertical groove is smaller than a radius of curvature of the inner circumferential surface of the cylindrical portion.

5. The spindle motor according to claim 4, wherein
the base member is made of a metal;
the metal is exposed on the inner circumferential surface of the cylindrical portion; and
a surface of the vertical groove is covered with an electrodeposition coating layer.

6. The spindle motor according to claim 1, wherein the inner circumferential surface of the cylindrical portion includes the vertical groove.

7. The spindle motor according to claim 6, wherein
the vertical groove has a circular or substantially circular arc shape in a plan view; and
a radius of curvature of a curved surface which defines the vertical groove is smaller than a radius of curvature of the inner circumferential surface of the cylindrical portion.

8. The spindle motor according to claim 6, wherein
the base member is made of a metal;
the metal is exposed on the inner circumferential surface of the cylindrical portion; and
a surface of the vertical groove is covered with an electrodeposition coating layer.

9. The spindle motor according to claim 1, wherein
the adhesive is not arranged to extend continuously in an annular shape; and
a pair of surfaces of the adhesive are closer to a circumferential center of the vertical groove than are circumferential end portions of the vertical groove.

10. The spindle motor according to claim 1, wherein
the base member includes a horizontal groove in an upper surface of the bottom plate portion; and
a space inside the vertical groove and a space inside the horizontal groove are continuous with each other.

11. The spindle motor according to claim 1, further comprising a stator core fixed to an outer circumferential surface of the cylindrical portion; wherein
the base member includes a circumferentially extending inner circumferential groove in the inner circumferential surface of the cylindrical portion; and
the inner circumferential groove and an area of contact between the cylindrical portion and the stator core are arranged to overlap with each other in a radial direction.

12. The spindle motor according to claim 1, wherein an electrically conductive adhesive is arranged at a position which does not overlap with the vertical groove between the bearing mechanism and the cup portion.

13. The spindle motor according to claim 12, wherein the electrically conductive adhesive is arranged at a circumferential position opposite to that of the vertical groove in a plan view.

14. The spindle motor according to claim 1, wherein a circumferential width of the vertical groove is arranged to be greater than about one third of an inside diameter of the cylindrical portion.

15. A disk drive apparatus comprising:
the spindle motor of claim 1;
an access portion arranged to perform at least one of reading and writing of information from or to a disk supported by the rotating portion of the spindle motor; and
a cover; wherein
the rotating portion and the access portion are accommodated in a case defined by of the base member and the cover.

16. The disk drive apparatus according to claim 15, wherein a gas filled into the case is helium, hydrogen, a gas mixture of helium and hydrogen, or a gas mixture of any one of the above and an air.

17. The spindle motor according to claim 1, wherein the cylindrical portion and the bottom plate portion are provided by a single monolithic member.

* * * * *